United States Patent [19]

Stockton et al.

[11] 4,397,148
[45] Aug. 9, 1983

[54] CONTROL SYSTEM FOR AN AUGMENTED TURBOFAN ENGINE

[75] Inventors: William W. Stockton; Walter D. Hutto, Jr., both of Cincinnati, Ohio

[73] Assignee: General Electric Company, Cincinnati, Ohio

[21] Appl. No.: 165,159

[22] Filed: Jul. 2, 1980

[51] Int. Cl.³ .............................................. F02K 3/02
[52] U.S. Cl. ...................................... 60/223; 60/235; 60/243
[58] Field of Search ................. 60/243, 235, 236, 237, 60/238, 239, 223

[56] References Cited

U.S. PATENT DOCUMENTS

| | | | |
|---|---|---|---|
| 3,854,287 | 12/1974 | Rembold | 60/239 |
| 3,886,730 | 6/1975 | Gruene | 60/39.28 R |
| 3,886,731 | 6/1975 | Gruene et al. | 60/39.28 R |
| 3,987,620 | 10/1976 | Giordano et al. | 60/39.28 R |
| 4,128,208 | 12/1978 | Ryan | 60/271 |
| 4,128,995 | 12/1978 | Toot | 60/243 |
| 4,159,625 | 7/1979 | Kerr | 60/243 |

Primary Examiner—Robert E. Garrett
Attorney, Agent, or Firm—Derek P. Lawrence

[57] ABSTRACT

The engine includes a main engine fuel flow, an augmentation fuel flow, and a variable area exhaust nozzle. Primary speed control means is powered by first electrical power supply means. Fan speed is controlled by modulation of main engine fuel flow. Loss of electrical power to the primary speed control means during augmented operation results in a reversion from fan speed control to core engine speed control while simultaneously reducing the augmentation fuel flow toward a minimum level and closing the variable area exhaust nozzle. Backup speed control means is coupled to the primary speed control means for limiting fan overspeed in augmented operation during loss of electrical power to the primary speed control means. The backup speed control means is powered by second electrical power supply means which is independent of the first power supply means. For example, in one embodiment involving aircraft application, the first electrical power supply means comprises an engine-driven alternator and the second electrical power supply means comprises an aircraft positioned power supply. The primary and backup speed control means may be coupled to separate windings of a single torque motor.

22 Claims, 4 Drawing Figures

CONTROL SYSTEM FOR AN AUGMENTED TURBOFAN ENGINE

BACKGROUND OF THE INVENTION

The present invention relates to an augmented turbofan engine, and more particularly, to backup control means for limiting fan overspeed during augmented operation of such an engine.

A gas turbine engine which drives a fan and causes a portion of the fan airflow to bypass the gas turbine, or core, is typically referred to as a turbofan engine. In a mixed flow gas turbine engine, the fan airflow and the turbine discharge are allowed to mix. Turbofan engines may include a variable area exhaust nozzle for developing the desired thrust. Such variable area exhaust nozzles are often employed on turbofan engines having thrust augmentation means, such as an afterburner or preturbine injection. Further information on such turbofan engines can be found in U.S. Pat. No. 4,128,995, entitled "Means and Apparatus for Stabilizing an Augmentor System," issued Dec. 12, 1978, to P. D. Toot, and in U.S. Pat. No. 4,128,208, entitled "Exhaust Nozzle Flap Seal Arrangement," issued Dec. 5, 1978, to E. W. Ryan, et al. Each of these patents is hereby incorporated into reference in the present application.

A conventional primary speed control system employed on mixed flow augmented turbofan engines includes control of fan speed by modulation of the main engine fuel flow and control of fan operating point, i.e., fan pressure ratio which is related to fan performance and required surge margin, by modulation of a variable area exhaust nozzle. This results in two control loops which are typically powered by a single engine electrical supply means, such as an engine-driven alternator. When fan speed is controlled in such a system, core engine speed will, through aerodynamic coupling, seek the steady-state value required to provide the necessary energy to keep the fan rotor at a governed speed. A hydromechanical core speed governor is typically employed to limit the core speed to a safe value. This value is slightly in excess of that which the core will achieve when operating normally in the previously described typical fan speed/fan operating point control mode.

This conventional control system is generally designed such that loss of electrical power thereto will result in reversion from speed control of the fan to speed control of the core engine and in failure of the variable area exhaust nozzle to a full closed position. Such a failure condition is desired in order to make available adequate thrust under the loss of electrical power condition. If the electrical power loss occurs while at a maximum nonaugmented power setting, speed control reverts to the core engine with an attendant slight increase in core speed. Fan speed, through aerodynamic coupling, will seek a value commensurate with the energy delivered to the fan turbine and the degree of fan throttling by the exhaust nozzle. The nozzle failure position is full closed so the fan will be throttled slightly more than during normal control system operation and fan speed will consequently seek a steady-state value well within its maximum speed capability.

Augmentor fuel flow control of such engines is also typically powered by the previously mentioned engine electrical supply means which may, for example, comprise an engine-driven alternator. The augmentor fuel control system is normally designed to establish the minimum level of augmentor fuel flow in the event of electrical power loss. This design is necessary for the case in which electrical power loss occurs while operating in the augmentation regime. However, to avoid throttling the fan into a surge condition, the system must be designed such that, at electrical power loss, augmentor fuel flow is reduced from a predetermined level toward a minimum level at a rate faster than the variable area exhaust nozzle is closed to minimum area, e.g., full closed.

The need to reduce augmentor fuel flow at a rate faster than exhaust nozzle closure creates a potential for serious fan overspeed. This overspeed potential exists during that portion of the augmentor fuel flow and exhaust nozzle area transient when the nozzle area is larger than normal for the particular augmentor fuel flow. When this condition exists, fan throttling is much less than normal and the energy available at the fan turbine is slightly higher than normal. This results in an acceleration of the fan to an excessive speed, i.e., a fan overspeed condition. Such fan overspeed conditions are highly undesirable as such conditions generally result in equipment damage and poor performance.

Accordingly, it is a general object of this invention to provide improved control means for an augmented turbofan engine.

It is another object of this invention to provide backup control means for limiting fan overspeed in augmented operation during loss of electrical power conditions.

It is another object of this invention to provide such backup control means which is lightweight and which utilizes already existing components of a primary speed control system.

SUMMARY OF THE INVENTION

In carrying out one form of the invention, we provide an augmented turbofan engine of the type having a main engine fuel flow and an augmentation fuel flow. The engine includes primary speed control means powered by a first electrical power supply means and a variable area exhaust nozzle. Fan speed is controlled by modulation of main engine fuel flow wherein loss of electrical power to the primary speed control means during augmented operation results in a reversion from fan speed control to core engine speed control and in reducing the augmentation fuel flow while changing the variable area exhaust nozzle from a relatively open position to a relatively closed position. Backup control means is coupled to the primary speed control means for limiting fan speed in augmented operation during a loss of the electrical power to the primary speed control means while changing the variable area exhaust nozzle from the relatively open position to the relatively closed position and while reducing the augmentation fuel flow from a predetermined level toward a minimum level.

BRIEF DESCRIPTION OF THE DRAWINGS

For a better understanding of the invention, reference may be had to the following description, taken in conjunction with the accompanying drawings, wherein:

FIG. 3A shows a prior art torque motor winding arrangement. FIG. 3B shows one form of torque motor winding arrangement of the present invention.

DETAILED DESCRIPTION OF THE INVENTION

Figure 1:
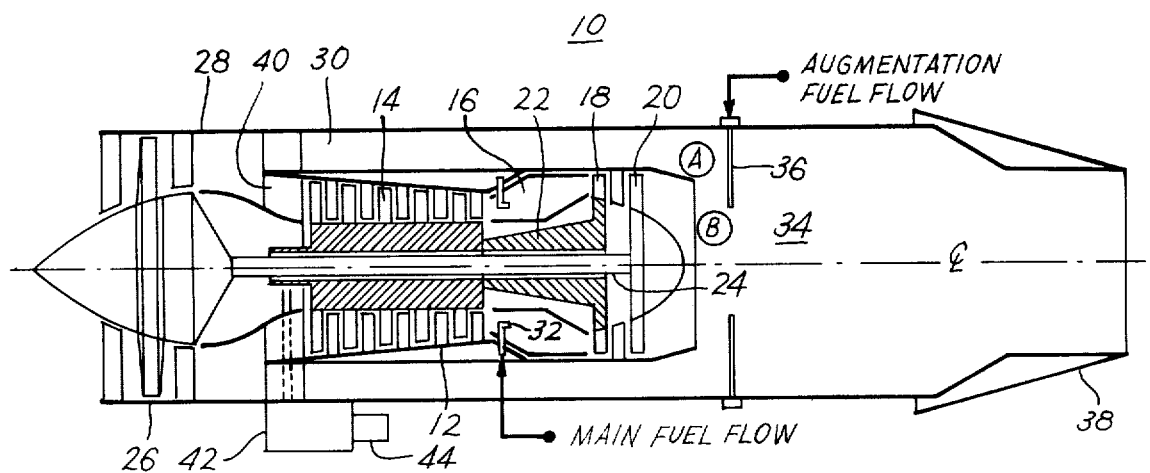
FIG. 1 is a schematic cross section of an exemplary augmented turbofan engine to which the control means of the present invention relates.

Referring initially to FIG. 1, one form of augmented turbofan engine to which the present invention relates is generally designated 10. For purposes of illustration, the exemplary engine 10 is shown in the form of a mixed flow turbofan. The turbofan engine 10 includes a core engine 12 which includes, in serial flow relationship, an axial flow compressor 14, a combustor 16, and a high pressure turbine 18. The high pressure turbine 18 is drivingly connected to the compressor 14 by a high pressure turbine shaft 22. The engine 10 also includes a low pressure system which includes a low pressure turbine 20. The low pressure turbine 20 is drivingly connected by a low pressure turbine shaft 24 to a fan 26. An outer nacelle 28 is spaced apart from the core engine 12 to define a bypass duct 30 therebetween.

The combustor section 16 includes main fuel nozzles 32 which receive the main fuel flow to the engine. Augmentation means 34 is provided downstream of the combustor section 16. In the exemplary engine 10, such augmentation means 34 is shown as including augmentation fuel nozzles 36. The augmentation fuel nozzles 36 receive the augmentation fuel flow. The engine 10 also includes a variable area exhaust nozzle 38.

In operation of the exemplary mixed flow turbofan engine 10 of FIG. 1, air enters the engine 10 and is initially compressed by the fan assembly 26. A first portion of this compressed air enters the bypass duct 30 and is subsequently discharged through the bypass duct 30 at locus A. Another portion of the compressed fan air enters an inlet 40 and is further compressed by the compressor 14. This further compressed air is discharged into the combustor 16 where it is burned with fuel to provide high energy combustion gases. These combustion gases pass through and drive the high pressure turbine 18 which, in turn, drives the compressor 14. The combustion gases subsequently pass through and drive the low pressure turbine 24 which, in turn, drives the fan 26. These combustion gases then pass along an exhaust flowpath whereupon they are discharged at locus B. Thus, the discharge represented at loci A and B provide discrete propulsive forces. The mixed flow from loci A, B is then discharged through the variable exhaust nozzle 38, thereby providing the desired total propulsive force.

The engine 10 includes a gearbox 42 coupled thereto. The gearbox 42 is utilized to drive various engine accessories. For example, the gearbox 42 may be coupled to an alternator 44 for supplying electrical power to various engine accessories.

Figure 2:
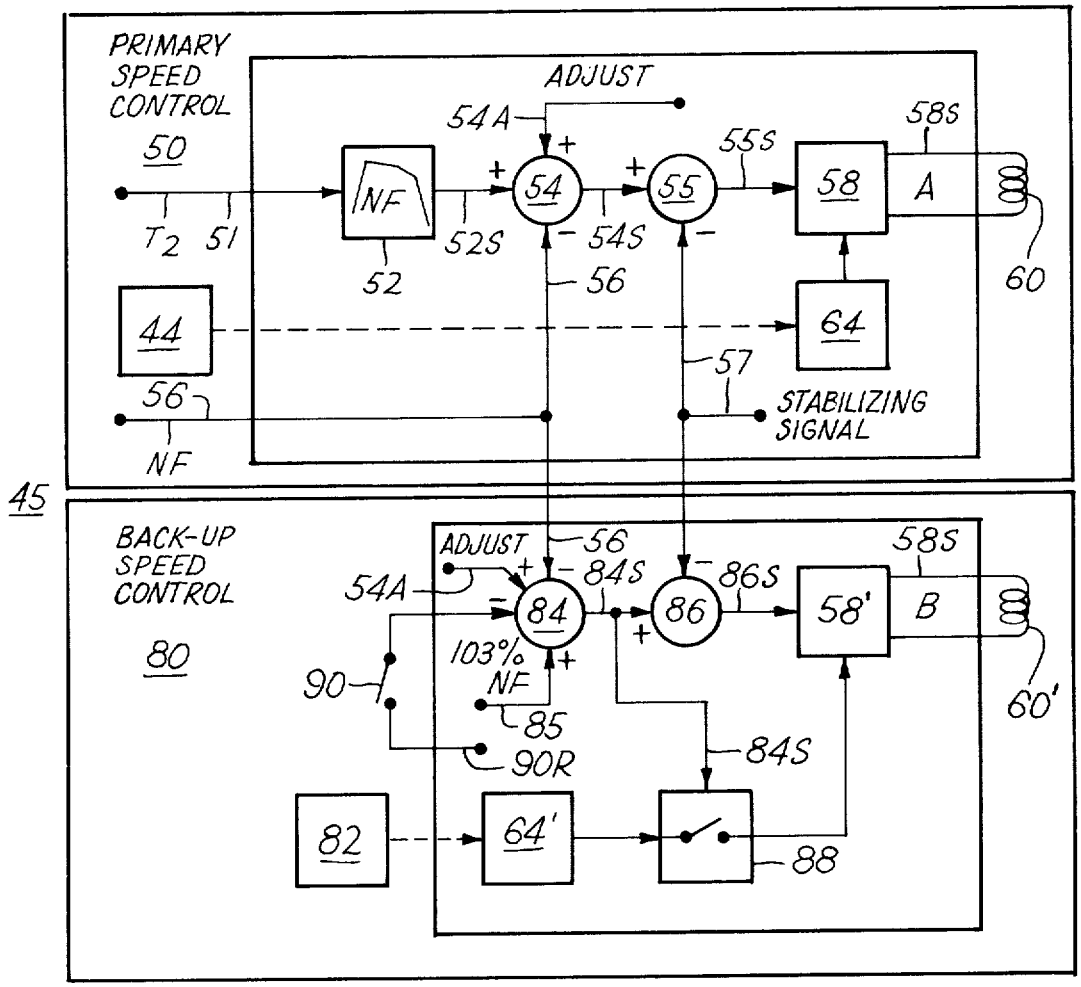
FIG. 2 is a schematic diagram showing one form of backup control means of the present invention in combination with a conventional primary speed control system, which combination is suitable for use with the turbofan engine of FIG. 1.

Referring now to FIG. 2, one form of speed control means for the engine 10 of FIG. 1 is generally designated 45. The speed control means 45 includes conventional primary speed control means 50 and also includes one form of backup speed control means 80 of the present invention.

Referring first to the primary speed control means 50, a maximum fan speed schedule 52 is provided for receiving a signal 51 representative of an engine operating parameter, such as fan inlet temperature (T2). The maximum fan speed schedule 52 develops an output signal 52S representative of the maximum fan speed as a function of a particular engine inlet temperature. A comparator 54 is provided to receive the fan schedule output signal 52S. A conventional self-powered fan speed sensor (not shown) is provided to develop a signal 56 representative of the actual fan speed NF. Actual fan speed signal 56 is coupled to the comparator 54. The comparator 54 develops an error signal 54S representing the difference between the maximum fan speed schedule value, signal 52S, and the actual fan speed, signal 56. Conventional adjusting means (not shown) is provided for providing an adjustment signal 54A to the comparator 54.

The fan error signal 54S is coupled to a second comparator 55. The comparator 55 also receives a conventional stabilizing signal 57. The stabilizing signal 57 may be representative of a main engine control metering valve rate signal (not shown). The second comparator 55 develops an output signal 55S which is coupled to a torque motor amplifier 58. The torque motor amplifier 58 develops an output signal 58S which results in an appropriate current flow in a torque motor winding 60. The torque motor winding 60 is part of a conventional torque motor (not shown). The torque motor winding 60 is typically part of the main engine control and functions as part of a conventional servo-valve (not shown) to limit the core engine fuel flow to the necessary level to maintain the scheduled maximum fan speed. Thus, the error signal 54S is employed to modulate the main engine fuel flow.

It is to be appreciated that the conventional primary speed control means 50 of FIG. 2 is typically powered by the engine-driven alternator means 44, also shown in FIG. 1. The engine-driven alternator means 44 operates a torque motor amplifier power supply 64, such as an ac to dc converter, which ultimately operates the torque motor amplifier 58, and hence, the torque motor winding 60. The torque motor winding 60 is normally biased in such a way as to increase main engine fuel flow with zero current flow or under loss of electrical power conditions. Under such zero current flow or loss of electrical power conditions, the normal backup is the mechanical core engine speed governor (not shown). However, as previously mentioned, loss of electrical power while in the augmented regime of engine operation may result in serious fan overspeed.

The backup speed control means 80 of the present invention will now be described. The backup speed control means 80 employs many of the same functional elements as the primary speed control means 50 so that, wherever possible, prime reference numerals have been employed to designate like elements.

The backup speed control means 80 is electrically powered by a second electrical power supply means 82 which is independent of the engine-driven alternator means 44 of the primary control means 50. In one embodiment, the independent electrical power supply means 82 may comprise an aircraft positioned electrical power supply, e.g., 28 VDC.

The backup speed control means 80 includes a first comparator 84 which receives a number of inputs. One input to the comparator 84 is the actual fan speed signal 56. A second input to the comparator 84 is a speed reference signal 85. The speed reference signal 85 is intended to represent a speed condition at which corrective action is required. For example, the speed reference signal 85 may be set at a fixed value which is approximately 3% above the maximum fan speed value set by the primary speed control means 50. For example, as shown in FIG. 2, speed reference signal 85 may be designated as 103% NF, where 100% NF represents maximum fan speed. The output of comparator 84 thus comprises an error signal 84S representative of the difference between the actual fan speed, signal 56, and a speed reference signal, signal 85. The error signal 84S is coupled to a second comparator 86. The second comparator 86 also receives the stabilizing signal 57 from the main engine control. The output 86S of the second comparator 86 is coupled to a second torque motor amplifier 58'. The torque motor amplifier 58' provides the appropriate electrical current to torque motor winding 60' in the main engine control. As will be more fully appreciated later, the torque motor winding 60' of FIG. 2 preferably comprises a second winding which operates on a torque motor (not shown in FIG. 2) which is common to the primary speed control means 50 and the backup speed control means 80.

The exemplary 28 VDC power supply 82 operates a second torque motor power supply 64' which, in turn, operates the torque motor amplifier 58'. A switch 88 may be disposed between the torque motor amplifier power supply 64' and the torque motor amplifier 58'. Switch 88 functions in response to error signal 84S. More particularly, switch 88 remains open until the error signal 84S is within a predetermined range of the speed reference signal 85. For example, switch 88 may be set to remain open until the error signal 84S is within 1% of maximum fan speed NF. Thus, the operation of backup speed control means 80 may be inhibited until the error signal 84S is within the predetermined range. If desired, the backup speed control means 80 may be responsive to the on/off condition of the first electrical power supply means 44. For example, the backup control means 80 may be rendered inoperable when the electrical supply 44 is on and rendered operable when the electrical supply 44 is off.

In the operation of the backup speed control means 80, actual fan speed is provided by the self-powered fan speed sensor (not shown) in the form of signal 56 and the resultant error signal 84S is normally much greater than 1% of the maximum speed signal NF. Thus, under these conditions, the torque motor amplifier power supply 64' is interrupted by switch 88 and the torque motor winding 60' current is zero so that the backup control means 80 does not interfere with the primary control means 50 unless an actual fan overspeed is present. If, however, actual fan speed, as represented by signal 56, exceeds the 103% reference signal 85, the torque motor amplifier 58' will receive the error signal 84S and will supply the necessary torque motor current to the winding 60' to hold the maximum speed to 103%.

For some applications, it is convenient to provide a test switch assembly 90 so that the proper operation of the backup speed control means 80 can be determined. In operation of the test switch 90, a reference reduction signal 90R can be coupled to the comparator 84. This coupling provides a reference signal which is a non-overspeed level so as to activate the circuitry which should then reduce the fan speed.

Figure 3A:
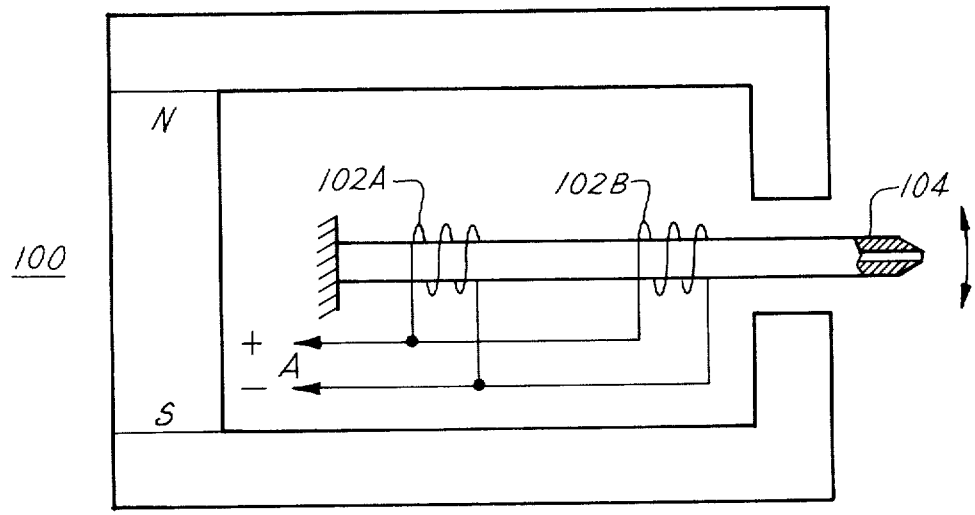
FIGS. 3A, 3B are schematic representations showing a portion of the backup control means of FIG. 2.
Figure 3B:
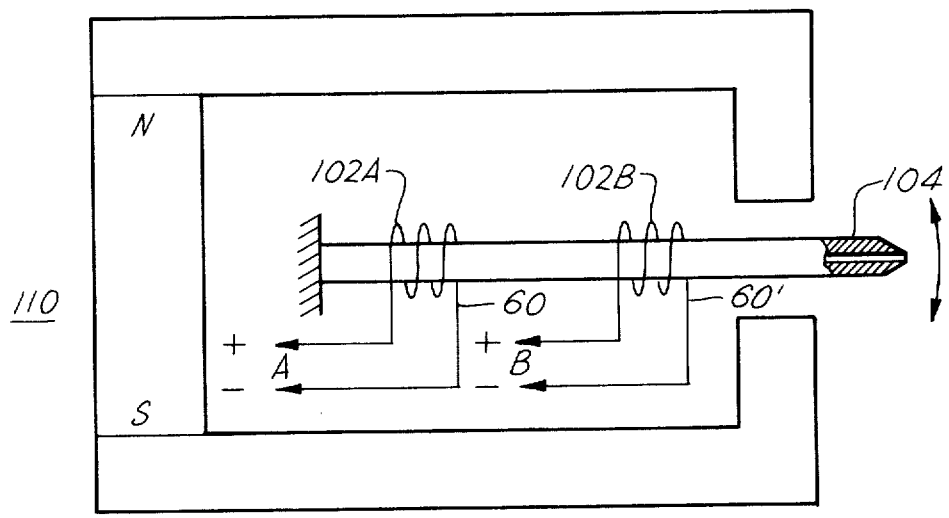

Referring now to FIGS. 3A, 3B, a preferred technique for activating the torque motor winding coils of FIG. 2 is disclosed. More particularly, FIGS. 3A, 3B are intended to represent the manner in which a normally existing torque motor, partially shown, is changed from a parallel aiding winding arrangement to an arrangement which operates with two separate input drivers, resulting in no new engine sensor parts while providing additional functions.

A prior art parallel aiding winding arrangement is depicted in FIG. 3A and is generally designated 100. In FIG. 3A, torque motor current is applied at point A to the parallel windings 102A, 102B. Current direction and magnitude through the windings 102A, 102B then determine the position of a jet pipe armature 104. The jet pipe armature 104 is part of a jet pipe servo (not shown) wherein the position of the jet pipe 104 results in a predetermined fuel valve position. In the normal arrangement of FIG. 3A, the total current through A is divided between the two electrically parallel windings 102A, 102B.

Referring now to the winding arrangement of FIG. 3B, generally designated 110, it is to be appreciated that a single torque motor may be shared by the primary speed control 50 and the backup speed control 80. More particularly, windings 102A and 102B are separated and primary speed control current from torque motor amplifier 58 is still applied at A. However, the backup speed control current from torque motor amplifier 58' is now applied at B. It is to be appreciated that windings 102A, 102B correspond to windings 60, 60', respectively, of FIG. 2. Either winding, 102A or 102B, can position the jet pipe 104 to the required position. In operation, however, only one winding at a time will be drawing current flow. More particularly, when the primary speed control 50 is functioning, current at point B will be zero. When the backup fan speed control 80 is functioning, current at point A will be zero.

An important advantage of the backup control means of the present invention is the use of normally existing sensors which are self-powered and the use of a normally existing torque motor.

As used in this application, the term signal may denote physical indicia such as mechanical linkage movement, or the like, or electrical indicia such as voltage and/or current. Further, although the invention has been described in connection with a mixed flow augmented turbofan engine, it is applicable to other forms of augmented turbofan engines.

While the present invention has been described with reference to specific embodiments thereof, it will be obvious to those skilled in the art that various changes and modifications may be made without departing from the invention in its broader aspects. It is contemplated in the appended claims to cover all such variations and modifications of the invention which come within the true spirit and scope of our invention.

We claim:

1. An augmented turbofan engine of the type having a main engine fuel flow and an augmentation fuel flow, primary speed control means powered by a first electrical power supply means and including a variable area exhaust nozzle, wherein fan speed is controlled by modulation of main engine fuel flow and wherein loss of electrical power to the primary speed control means during augmented operation results in a reversion from fan speed control to core engine speed control and in reducing the augmentation fuel flow while changing the variable area exhaust nozzle from a relatively open position to a relatively closed position, wherein the improvement comprises:

backup speed control means coupled to the primary speed control means for limiting fan speed in augmented operation during a loss of said electrical power to said primary speed control means while other apparatus changes said variable exhaust nozzle from said relatively open position to said relatively closed position and while other apparatus reduces said augmentation fuel flow from a predetermined level toward a minimum level.

2. An augmented turbofan engine in accordance with claim 1 in which said first electrical power supply means comprises engine-driven alternator means.

3. An augmented turbofan engine in accordance with claim 2 which includes a second electrical power supply means for powering said backup speed control means, said second power supply means being independent of said first power supply means.

4. An augmented turbofan engine in accordance with claim 3 in which said second power supply means is positioned remote from said engine.

5. An augmented turbofan engine in accordance with claim 3 in which
   (a) said primary speed control includes:
      (i) means for developing a first signal representative of actual fan speed,
      (ii) maximum fan speed schedule means responsive to an engine operating parameter for developing a second signal representative of maximum allowable fan speed,
      (iii) first comparator means coupled to receive said first and second signals for comparing said signals and developing a third signal representative of the difference therebetween,
      (iv) motor means responsive to said third signal and powered by said first electrical power supply means for modulating said main engine fuel flow in accordance with said third signal; and
   (b) said backup speed control means includes:
      (i) means for developing a fourth signal representative of a reference fan speed corresponding to a predetermined fan speed condition,
      (ii) second comparator means coupled to receive said first signal representative of actual fan speed and said fourth signal representative of reference fan speed and developing a fifth signal representative of an actual fan speed condition greater than said reference speed condition, and
      (iii) motor means responsive to said fifth signal and powered by said second electrical power supply means for modulating said main engine fuel flow in accordance with said fifth signal.

6. An augmented turbofan engine in accordance with claim 5 in which said motor means of (a)(iv) and (b)(iii) comprise a single motor means including motor winding means.

7. An augmented turbofan engine in accordance with claim 6 in which said motor winding means comprises at least two windings which are electrically separate and which are wound around jet pipe means wherein said main fuel flow is affected by the position of said jet pipe means.

8. An augmented turbofan engine in accordance with claim 7 in which said third signal is coupled to one of said windings and said fifth signal is coupled to the other of said windings wherein only said one winding is energized when said first electrical power supply means is functioning and only said second winding is energized when said first electrical power supply means is not functioning.

9. An augmented turbofan engine in accordance with claim 8 in which said predetermined fan speed condition comprises a fan overspeed condition.

10. An augmented turbofan engine in accordance with claim 9 in which said backup speed control means includes means for inhibiting the energization of said second winding until said first signal is within a predetermined range of said fan overspeed condition.

11. An augmented turbofan engine in accordance with claim 1 in which said engine comprises a mixed flow gas turbine engine.

12. In a control system for an augmented turbofan engine of the type having a main engine fuel flow, which comprises:
   (a) primary speed control means powered by first electrical power supply means for controlling fan speed by modulation of the main engine fuel flow; and
   (b) backup speed control means coupled to said primary speed control means for limiting fan speed in augmented operation by modulation of the main engine fuel flow during loss of said first electrical power supply means, said backup speed control means being powered by electrical power supply means.

13. A control system in accordance with claim 12 in which said first electrical power supply means comprises engine-driven alternator means.

14. A control system in accordance with claim 13 in which said electrical power supply means of (b) comprises second electrical power supply means for powering said backup speed control means, said second power supply means being independent of said first power supply means.

15. A control system in accordance with claim 14 in which said second power supply means is positioned remote from said engine.

16. A control system in accordance with claim 14 in which:
   (a) said primary speed control means includes:
      (i) means for developing a first signal representative of actual fan speed,
      (ii) maximum fan speed schedule means responsive to an engine operating parameter for developing a second signal representative of maximum allowable fan speed,
      (iii) first comparator means coupled to receive said first and second signals for comparing said signals and developing a third signal representative of the difference therebetween,
      (iv) motor means responsive to said third signal and powered by said first electrical power supply means for modulating said main engine fuel flow in accordance with said third signal; and
   (b) said backup speed control means includes:
      (i) means for developing a fourth signal representative of a reference fan speed corresponding to a predetermined fan speed condition,
      (ii) second comparator means coupled to receive said first signal representative of actual fan speed and said fourth signal representative of reference fan speed and developing a fifth signal representative of an actual fan speed condition greater than said reference speed condition, and
      (iii) motor means responsive to said fifth signal and powered by said second electrical power supply means for modulating said main engine fuel flow in accordance with said fifth signal.

17. A control system in accordance with claim 16 in which said motor means of (a)(iv) and (b)(iii) comprise a single motor means including motor winding means.

18. A control system in accordance with claim 17 in which said motor winding means comprises at least two windings which are electrically separate and which are wound around jet pipe means wherein said main fuel flow is affected by the position of said jet pipe means.

19. A control system in accordance with claim 18 in which said third signal is coupled to one of said windings and said fifth signal is coupled to the other of said winding wherein only said one winding is energized when said first electrical power supply means is functioning and only said second winding is energized when said first electrical power supply means is not functioning.

20. A control system in accordance with claim 19 in which said predetermined fan speed condition comprises a fan overspeed condition.

21. A control system in accordance with claim 20 in which said backup speed control means includes means for inhibiting the energization of said second winding until said first signal is within a predetermined range of said fan overspeed condition.

22. A control system in accordance with claim 12 in which said engine comprises a mixed flow gas turbine engine.

* * * * *